United States Patent

[11] 3,623,556

[72] Inventor Monte E. Adams
    4650 Maple Ave., La Mesa, Calif. 92041
[21] Appl. No. 843,950
[22] Filed July 23, 1969
[45] Patented Nov. 30, 1971

[54] WEEDING AND CULTIVATING TOOL
    9 Claims, 7 Drawing Figs.
[52] U.S. Cl. ............................................. 172/371,
    172/375, 172/380, 172/768
[51] Int. Cl. ............................................. A01b 1/10,
    A01b 1/22
[50] Field of Search ............................................. 172/349,
    371, 372, 376, 378, 380, 769, 771

[56] References Cited
    UNITED STATES PATENTS

| | | | |
|---|---|---|---|
| 461,537 | 10/1891 | Lindgren | 172/771 |
| 891,412 | 6/1908 | Earle | 172/371 |
| 922,202 | 5/1909 | Senn | 172/371 |
| 1,000,473 | 8/1911 | Wilson | 172/371 |
| 1,517,572 | 12/1924 | Means | 172/771 |
| 1,685,268 | 9/1928 | Benjamin | 172/765 |
| 1,722,063 | 9/1925 | Spitzenberg | 172/371 |
| 2,528,576 | 7/1946 | Brown | 172/349 |
| 2,587,106 | 11/1948 | Brown | 172/349 |
| 2,662,461 | 12/1953 | Upson | 172/376 |
| 2,864,297 | 12/1958 | Adams | 172/376 |
| 3,000,451 | 9/1961 | Adams | 172/376 |
| 3,000,452 | 9/1961 | Adams | 172/376 |

FOREIGN PATENTS

| 431,802 | 7/1935 | Great Britain | 172/380 |
|---|---|---|---|

Primary Examiner—Robert E. Pulfrey
Assistant Examiner—C. W. Hanor
Attorney—Carl R. Brown ABSTRACT: A weeding and cultivating tool having edge abutting, dual disclike cutting blades with handle shank connecting portions that are integral with the blades and are bent upward at the abutting edges to provide a centered support that has a narrow thickness in the forward and reverse direction of movement of the blades. Each blade is substantially normal to the shank portions and extends at a slight downward angle from normal at the radius bend to resist permanent distortion from bending and twisting of the blades and shank when forced through the earth. The disclike cutting blades have continuous cutting edges around their open periphery that merge at the shank portions to form front and rear cutting crotches that extend into the central shank portions. In one embodiment, the lower surface of each disclike cutter has a front to rear concave curvature which, when formed with said radius bend, results in compound curvature which further resists permanent distortion of the blades and shank. The entire tool, except for its handle, can be formed from a single metal blank or in the alternative from two joined metal blanks.

PATENTED NOV 30 1971 3,623,556

*INVENTOR.*
MONTE E. ADAMS

BY Carl R. Brown

ATTORNEY

WEEDING AND CULTIVATING TOOL

BACKGROUND OF THE INVENTION

There are many different types and designs of weeding and cultivating handtools. Particular ones of these known weeding and cultivating handtools were invented and patented by the applicant as shown by U.S. Pat. Nos. 2,864,297; 3,000,451 and 3,000,452. The invention now patented employs dual merged disc cutters that have a continuous cutting edge around their open periphery, any portion of which project as a curved cutting edge from the normal direction of thrust of the tool through the earth. It provides a slicing cutting, self-cleaning, action on contact with weeds and the earth through lightweight simplified construction when compared with the prior art, and has found particular satisfaction and acceptance by the manufacturers, hardware trade, and consumers. However, during numerous experiments by the applicant to perfect has patented invention, he discovered a "new and different" structure which further reduces resistance, making weed cutting and ground cultivation considerably easier. The new discovery further reduces structure, weight and improves self-cleaning and self-sharpening characteristics. This also allows a simplified design which can be formed from a single lower cost metal blank, or an alternate low-cost pair of metal blanks, thereby reducing the number of parts, the actual need of metal quality, and eliminates several production assembly tasks resulting in lower cost to the manufacturer, the hardware trade, and the consumers for this more efficient structure.

SUMMARY OF THE INVENTION

In an exemplary embodiment of the weeding and cutting tool of this invention, a metal cutting head is formed from a single metal blank or a pair of metal blanks to have a pair of cutting blades with the configuration and effect of dual merged disclike cutters with an integral support shank and a handle receiving section. The disclike cutting blades have unobstructed and smooth upper and lower surfaces with the side edges bent upward and joined in abutting relationship to form the shank portion of the handle receiving section. The blades extend from the bend at the shank portions at a slightly downward angle from a 90-degree angle to the shank portion. Each of the disclike cutting blades have continuous cutting edges around their open periphery that merge at the shank portions to form front and rear cutting crotches that extend up into the shank structure.

The cutting head, being formed from one of the alternate two metal blanks, provides a simplified and comparatively inexpensive one or alternate two-piece construction. The slight downward angle of the blades combined with the spacing of the cutting crotches and the smooth surfaced, continuous integral structure from each blade into the centered shank portions, provides numerous weeding and cultivating uses with minimum resistance, maximum self-cleaning characteristics, optimum cutting efficiency, and reduced distortion of the blades when in use. The continuous curved and angular cutting edges of the blades in combination with the cutting crotches that extend up into the shank portions, provides cutting surfaces which slice weeds and soil an any direction of thrust. The shank portions are relatively thin in the direction of forward and reverse movement of the tool and the front and rear edge surfaces of the shank portions are sharply beveled to provide ease of movement of the shank portions through the earth with a minimum of resistance.

Further, the slight downward angle of the blades from the radius bend at the centered shank portions, functions to effect cutting action first at the outer extremity of the cutting edges of the blades. This minimizes resistance where cutting is deepest and allows gradual cutting action toward the center of the blades as the tool is moved through the earth, thereby providing a progressive cutting action which further reduces resistance. The continuous cutting edges are curved in a manner in which any portion of the edge projects as a curved or angled cutting edge from the normal direction of thrust. This functions in combination with the downward angle of the blades to produce a slicing effect on contact with weeds and earth that gradually distributes the cutting action throughout the continuous curved cutting edge. Also the blades in one embodiment have an undersurface that is concave in the front to rear direction and a curved upper surface that is convex in the front to rear direction. This curved configuration functions to provide controlled depth in operation of the tool.

Also the downward angle of the blades from the shank portion provides a bend angle of greater than 90 degrees that affords increased resistance to permanent distortion from bending and twisting of the blades and shank portions when forced through the earth. This enhances the effective flexible strength of the blades and shank portions and permits effective use of lightweight, lower cost metals in making the cutterhead and allows construction of the improved handtool cutterhead from only one- or two-piece metal blanks. In the embodiment having the concave undersurface, the blade has compound curves where needed, to provide further increased resistance against permanent distortion from bending and twisting of the blades and shank portions.

It is therefore an object of this invention to provide a new and improved cultivating and weeding handtool.

It is another object of this invention to provide a new and improved cultivating and weeding handtool having a cutterhead that is constructed from a single-piece metal blank.

It is another object of this invention to provide a new and improved cultivating and weeding handtool with a pair of cutter blades extending from a central shank, which cutter blades have a given angle that resists permanent distortion from bending of the blades and shank when the cutterhead is forced through the earth.

It is another object of this invention to provide a new and improved cultivating and weeding handtool with a central shank portion and outwardly extending unobstructed and smooth surfaced, cutting blades that have given angles and curved shapes that resist bending of the blades and shank, and which curved shapes and angles provide improved and easier cutting and slicing of weeds and earth in use of the tool.

It is another object of this invention to provide a new and improved cultivating and weeding handtool having a cutting head with dual merged disclike cutters that are supported by a central shank portion for providing clean and unobstructed blade surfaces in their movement through the earth and that has a minimum of resistance of the shank structure in movement through the earth.

It is another object of this invention to provide a new and improved cultivating and weeding handtool of the dual merged disclike cutters that may be made of lightweight, low-cost metals that would not be satisfactory for multiple-piece design.

It is another object of this invention to provide a new and improved cultivating and weeding handtool that is lighter weight, more durable, and more efficient in use, and that may be fabricated at a lower cost from lightweight, low-cost metals that comprise single-piece metal blanks or a pair of metal blanks.

Other objects and many attendant advantages of this invention will become more apparent upon a reading of the following detailed description and an examination of the drawing in which like reference numerals designate like parts throughout and in which.

Figure 1:
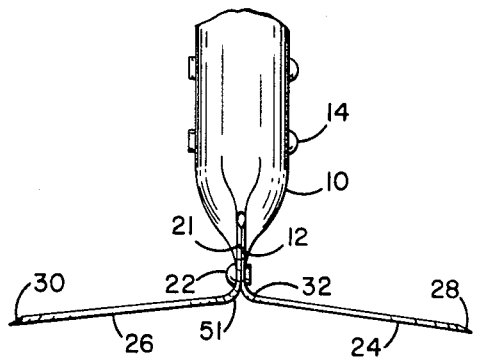
FIG. 1 is a front elevational view of the weeding and cultivating handtool of this invention with parts removed.
Figure 2:
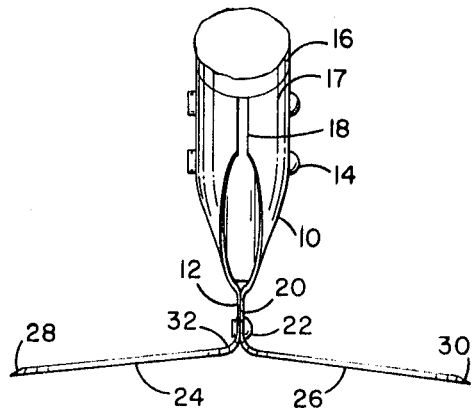
FIG. 2 is a rear elevational view of an embodiment of the weeding and cultivating handtool of this invention with parts removed.
Figure 4:
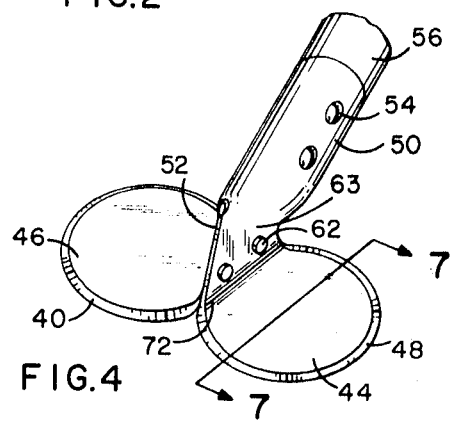
FIG. 4 is a perspective view of the embodiment illustrated in FIG. 3 with parts removed.
Figure 5:
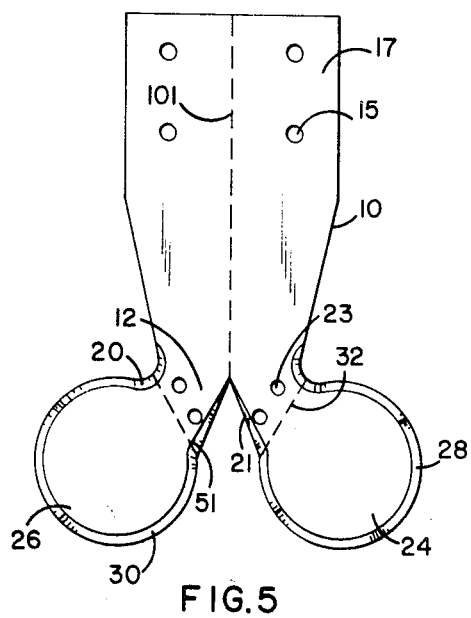
FIG. 5 is a plan view of the metal blank used in making the cutting head.

Referring to FIGS. 1, 2 and 5, a cutting head 10 comprises a single metal blank 10 of a sheet of lightweight and relatively low-cost metal. The blank 10 has a pair of disclike cutting blades 24 and 26 that have continuous curved cutting edges 28 and 30 on their open edge periphery. The single blank is formed in any suitable manner, such as by progressive die, into the approximate shape illustrated in FIGS. 1 and 2 and as generally illustrated in FIG. 4 or alternate shape FIG. 6. The upper portion of the blank 17 is curved to form a ferrule into which a handle 16 is inserted and secured by rivets, bolts, or the like 14 that project through holes 15. The ferrule narrows to the shank portion 12 that is integral with the ferrule 17 and cutter blades 24 and 26. The abutting edges of the cutter blades are bent along bend line 32 and have a slight downward angle from a perpendicular angle to the shank portion 12. The amount of downward angle varies with the tool model size; the larger the tool the more angle required to resist distortion and enhance gradual cutting action. The sides of the shank portion 12 abut and are secured together by suitable rivets or the like 22 that pass through holes 23.

It may be observed that the construction permits effective use of a thin gauge metal blank 10, which provides a very thin shank portion 12, in the forward and reverse direction of movement of the cutterhead 10. Further the front edge 21 of the shank portion 12 has beveled edges forming a substantially sharp edge along the front edge of the shank portion. This construction further reduces the resistance of movement of the shank portion 12 through the earth. The cutting edges of the disclike blades at 51 form a cutting crotch at the intersection of the blades in the assembled condition of FIG. 1, that provides a cutting edge completely across the front surface of the cutting blades and these cutting edge portions 51 merge into the beveled portions 21 to provide the front cutting edge surface of the shank portion for reduced resistance and cutting movement through the earth. The rear shank edge 20 has a similarly beveled edge as previously described relative to the front edge 21 and forms cutting edges for the continuous curved cutting crotch at the rear edge of the tool. This sharp edge is extremely efficient in the rearward movement, primarily due to the angle of the blades relative to the handle, with very slight exertion of force on the handle. Accordingly, the tool can be moved in a forward or reverse direction with efficient cutting action and considerably reduced resistance of movement of the thin shank portion 12 through the earth.

Figure 6:
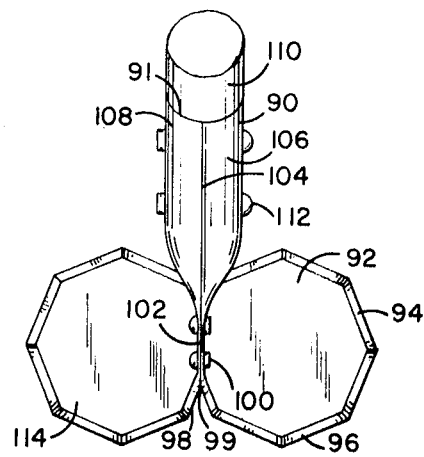
FIG. 6 is a top plan view with parts of the handle removed and with the cutting blades having a polysided shape.

The downward angle of the two disclike blades 24 and 26, which may be in the order of about 10 degrees, in conjunction with the curved blade edges 28 and 30, or the alternate polysided blade edges 94 of FIG. 6, function to effect first cutting action at the outer extremities of the cutting blades in movement of the blades through the earth. This provides a gradual entry into weed roots or a progressive contact of the cutting blades with the earth or weeds requiring only a gradual application of force, and thereby tends to minimize the force required to move the cutting head through the earth where the cutting is deepest, and facilitates a gradual cutting action toward the center of each of the blades as the cutting head is moved through the earth, further reducing resistance. Also this downward angle of the cutting blade provides a radius bend angle at bend 32 that is more than 90 degrees relative to the shank. Thus upward force on the blades 24 and 26 tending to bend the blades at radius bend 32 or any tendency to pull the shank portions 12 apart at their abutting connection, is resisted by the radius bend at 32 which resistance would be less if the blades 24 and 26 were at a 90-degree angle to the shank portions 12. Thus the downward angle increases the ability of the cutting blades 24 and 26 to resist permanent distortion from bending or twisting of the blades and shank portions when forced through the earth and the strength of the blades is enhanced.

Figure 3:
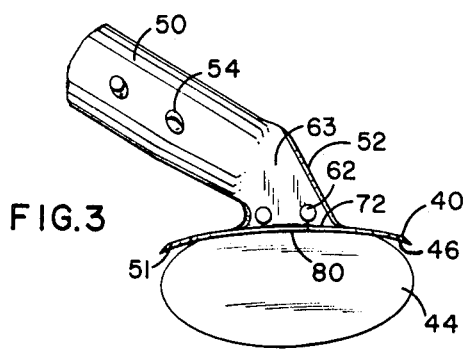
FIG. 3 is a side elevational view of a modified form of the cutting head at the side view of one of the downwardly angled cutting blades, and the other opposite blade as it would appear from such side angle view, with parts removed.
Figure 7:
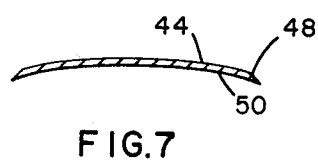
FIG. 7 is a sectional view taken along lines 7—7 of FIG. 4.

In the embodiment of FIGS. 3, 4 and 7, the cutting head 50 is formed from a metal blank substantially as illustrated in FIG. 5 and has a integral ferrule for receiving handle 56 that is secured by rivets 54. The shank portions 63 are secured in flat abutment by rivets 62 and have beveled sharp front edges 52. The rear edge of the shank portion 63 (not shown) has a similar beveled sharp edge for reduced resistance movement through the earth in the reverse direction. The cutting blades 44 and 46 are curved to provide a concaved undersurface 80 in the front to rear direction and a convex upper surface. This concave disclike blade has been found to provide improved control in depth of movement of the cutting blades through the earth and self-digging characteristics. Also these curved blade surfaces in conjunction with the downward angle of the blades as illustrated in FIGS. 1, 2 and 3, provide compound curved blades that extend into the radius bend 72 at the shank portions 63 and further resist bending of the blades and shank when forced through the earth and provide additional resistance to force and strain to permit use of lightweight, low-cost metals in blank form for making the cutting head.

Referring to FIG. 6, the cutting head 90 is formed from a pair of blanks, such as generally illustrated in FIG. 5, which blanks are formed into two pieces along dotted line 101. These two blanks are shaped to form a ferrule 90 with the half-cylindrical sides 106 and 108 being connected by rivets 112 to a handle 110. The upper edge surface of the sides 106 and 108 abut 104 to provide aligned edge contact through the shank portion 102. The cutting blades 92 and 114 are secured to the shank portion 102 by rivets 100. The blades 92 and 114 have polysides with cutting edges 94 and 96 that present angled cutting surfaces in the forward and reverse direction of movement of the cutting head through the earth. The cutting blades merge to form a cutting crotch 98 that extends up into the shank portion 102 at 99 forming a continuous cutting surface to the forward movement of the cutting blades. The rear cutting edges form a similar cutting crotch (not shown) in the manner previously described. It may be understood that the polysided blades 92 and 114 may have the flat configuration of FIGS. 1 and 2 or have the concave and convex surfaces of FIGS. 3, 4 and 7. Also, round blades, as in FIGS. 1 through 5, may be used in the two-piece metal blank design.

The ferrules shown, as for example ferrule 90 of the cutting head in FIG. 6, are for a short handle design which abuts against a circumferential shoulder in the handle portion 110 to merge in a relatively smooth joint at 91 in FIG. 6. The handles may have a short length for close work or a long length for use of the tool in a standing position. Ferrules for the long length are not recessed into the handle.

Having described by invention, I now claim:

1. A weeding and cultivating handtool comprising,
a pair of disclike cutting blades,
adjacent side-edge portions of said cutting blades being formed upward at a radius bend angle along bend lines forming integral centered handle shank connecting portions that abut just above the cutting edges,
securing means for securing said handle shank connecting portions together to form an abutting connection of dual disclike cutting blades,
each of said disclike cutting blades have a continuous cutting edge around their open-edge periphery,
the intersection of said blades and said shank-connecting portions form front and rear crotches with cutting surfaces and said handle shank-connecting portions have front and rear cutting edges that are extensions of said cutting edges forming said crotches,
the cutting edge of each of said disclike cutting blades extend in opposite directions from the front crotch in a continuous curvature forwardly, outwardly, and rearwardly to the rear crotch, forming cutting edges that can cut in every substantially horizontal direction of movement of the blades,
each of said cutting blades extend from said shank in opposite directions that are normal to said bend line and said blades are at a slight downward angle from said bend line, and each of said cutting blades have a front-to-rear, downwardly concave curvature, that extends into said radius bend angle forming a compound curvature bend of said blades that resists permanent distortion of said blades when in use under pressure or stress.

2. A weeding and cultivating handtool as claimed in claim 1 in which, said cutting blades each have smooth upper and lower surfaces over the entire surface area of the cutting blades without structural obstructions.

3. A weeding and cultivating handtool as claimed in claim 1 in which, said handle connection includes a ferrule that is an integral part of said shank and cutting blades.

4. A weeding and cultivating handtool as claimed in claim 3 in which, said dual cutting blades and shank and ferrule are formed from a single blank of metal.

5. A weeding and cultivating handtool as claimed in claim 3 in which, said dual cutting blades and shank and ferrule are formed from a pair of metal blanks with one cutting blade and substantially one-half of said shank and said ferrule being formed from each blank.

6. A weeding and cultivating handtool as claimed in claim 1 in which, said cutting blades have a bend angle constituting said slight downward angle that is slightly larger than 90 degrees.

7. A weeding and cultivating handtool as claimed in claim 1 in which, said cutting blades have a front-to-rear concave curved lower surface and a front-to-rear convex upper surface.

8. A weeding and cultivating handtool as claimed in claim 1 in which, the cutting edges of the open periphery of said blades have a continuous curve.

9. A weeding and cultivating handtool as claimed in claim 1 in which, said cutting blades are polysided with the cutting edges having an angular position relative to front-to-rear movement of the blades in normal use.

* * * * *

UNITED STATES PATENT OFFICE
CERTIFICATE OF CORRECTION

Patent No. 3,623,556      Dated November 30, 1971

Inventor(s) Monte E. Adams

It is certified that error appears in the above-identified patent and that said Letters Patent are hereby corrected as shown below:

Column 5, line 11, cancel "1" and insert --2--.

Signed and sealed this 25th day of April 1972.

(SEAL)
Attest:

EDWARD M. FLETCHER, JR.      ROBERT GOTTSCHALK
Attesting Officer      Commissioner of Patents